(12) United States Patent
Zegenhagen

(10) Patent No.: US 10,879,771 B2
(45) Date of Patent: Dec. 29, 2020

(54) COOLING SYSTEM AND METHOD FOR ELECTRIC ROTATING MACHINE

(71) Applicant: Siemens Aktiengesellschaft, Munich (DE)

(72) Inventor: Mark Tobias Zegenhagen, Berlin (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 16/486,702

(22) PCT Filed: Jan. 22, 2018

(86) PCT No.: PCT/EP2018/051421
§ 371 (c)(1),
(2) Date: Aug. 16, 2019

(87) PCT Pub. No.: WO2018/149588
PCT Pub. Date: Aug. 23, 2018

(65) Prior Publication Data
US 2020/0059135 A1    Feb. 20, 2020

(30) Foreign Application Priority Data
Feb. 17, 2017   (EP) .................................... 17156700

(51) Int. Cl.
*H02K 9/20*          (2006.01)
(52) U.S. Cl.
CPC ...................................... *H02K 9/20* (2013.01)
(58) Field of Classification Search
CPC ............ H02K 9/20; H02K 9/19; H02K 9/193; H02K 9/197; H02K 5/20

(Continued)

(56) References Cited

U.S. PATENT DOCUMENTS 1,687,542 A * 10/1928 Carrier ..................... H02K 9/12
261/115
2,604,500 A * 7/1952 De Koning .............. H02K 9/20
310/52

(Continued)

FOREIGN PATENT DOCUMENTS

| RU | 2095921 C1 | 11/1997 |
|---|---|---|
| SU | 306531 A1 | 6/1971 |
| SU | 551763 A1 | 3/1977 |

OTHER PUBLICATIONS

PCT International Search Report and Written Opinion of International Searching Authority dated Mar. 14, 2018 corresponding to PCT International Application No. PCT/EP2018/051421 filed Jan. 22, 2018.

*Primary Examiner* — Michael Andrews
(74) *Attorney, Agent, or Firm* — Henry M. Feiereisen LLC

(57) ABSTRACT

An electric rotating machine includes a machine housing having a mixed condensation chamber, a rotor accommodated in the machine housing, and a stator accommodated in the machine housing in adjacent relationship to the mixed condensation chamber. A cooling device includes a first assembly to expose at least a part of the stator and/or the rotor to a vaporization coolant which vaporizes when contacting the part so as to effect a vaporization cooling, and a second assembly to dispense a liquid condensation coolant into the mixed condensation chamber for contacting the vaporization coolant so as to effect a mixed condensation of the vaporized vaporization coolant with the liquid condensation coolant in the mixed condensation chamber.

18 Claims, 4 Drawing Sheets

(58) Field of Classification Search
USPC .................................. 310/54, 58, 60 R, 60 A
See application file for complete search history.

(56) References Cited

U.S. PATENT DOCUMENTS

| | | | | |
|---|---|---|---|---|
| 3,648,085 | A | * | 3/1972 | Fujii ........................ H02K 9/19 |
| | | | | 310/54 |
| 5,030,863 | A | * | 7/1991 | Yoshimura ............. H02K 55/04 |
| | | | | 310/52 |
| 8,581,455 | B2 | | 11/2013 | Woolmer |
| 2015/0171707 | A1 | * | 6/2015 | Shoykhet ................ H02K 9/00 |
| | | | | 310/54 |

* cited by examiner

COOLING SYSTEM AND METHOD FOR ELECTRIC ROTATING MACHINE

CROSS-REFERENCES TO RELATED APPLICATIONS

This application is the U.S. National Stage of International Application No. PCT/EP2018/051421, filed Jan. 22, 2018, which designated the United States and has been published as International Publication No. WO 2018/149588 A1 and which claims the priority of European Patent Application, Serial No. 17156700.1, filed Feb. 17, 2017, pursuant to 35 U.S.C. 119(a)-(d).

BACKGROUND OF THE INVENTION

The invention relates to an electric rotating machine comprising a rotor and a stator.

In addition, the invention relates to a method for cooling an electric rotating machine comprising a rotor and a stator.

Losses in such electric rotating machines, for example, motors and generators, in particular in current-conducting windings, dynamo plate bodies, and solid iron parts, are converted into heat and heat up the machine components. The purpose of machine cooling is the dissipation of the occurring heat loss flows to the surroundings, so as not to exceed component temperature limits. In addition, the cooling and/or the resulting operating temperatures influence the machine efficiency, the machine use, the manufacturing costs and possibly, in particular in the case of permanently-excited machines, the material costs. Furthermore, the size of the re-cooling system, the volumetric and gravimetric power density, and the costs of the entire machine, in particular of the re-cooling system, are scaled by the selection of the cooling method in the case of a closed cooling circuit.

The progressive torque and/or power density increase of large-scale electric machines having nominal powers in the megawatt range is predominantly limited by cooling-technology measures, since the volumes of the loss sources increase cubically, but the heat-dissipating surfaces thereof only increase quadratically.

Sensitive cooling concepts (without evaporation) using air, in particular at ambient pressure or in special cases using gases such as helium or hydrogen at pressures greater than the ambient pressure, are prior art, in order to use more favorable heat capacities and heat transfer coefficients in comparison to air with lower ventilation losses at the same time. In addition, electric rotating machines are sensitively cooled using water or oils in various embodiments with increased expenditure. The described invention is predominantly directed to an improvement of the sensitive cooling concepts, in which the components are cooled in direct contact with air in a closed circuit and the heat absorbed in this case by the air is subsequently emitted to the surroundings in an air-water or air-air heat exchanger, without significantly increasing the system complexity.

There is significant potential for increasing the volumetric machine power density in the reduction of the flow cross sections required for the airflow by increasing the heat absorption capacity of the coolant, on the other hand, in the reduction of the heat transfer areas by increasing the heat transfer during heat emission to the external cooling fluid, for example, water or air.

To achieve the described primary goal of the power density increase and also the secondary goals, thus in particular the following two requirements of a more efficient, innovative cooling have to be met:
 a significant increase of the heat transfer from the component surface to be cooled to the cooling medium or the reduction of the convection resistance in comparison to air and
 a significant increase of the heat absorption capacity of the cooling medium in comparison to air.

U.S. Pat. No. 3,648,085 describes a method and a device for cooling the heat-generating electric windings of a dynamo-electric machine, by spraying them directly with an atomized coolant, so that a film made of liquid coolant is deposited, which dissipates the absorbed heat as it drains off.

U.S. Pat. No. 2,604,500 describes a cooling system for electric motors and generators by means of spray cooling, wherein the vaporized coolant condenses in a chamber due to a heat exchanger. A vacuum pump regulates the pressure in the chamber.

Published application SU 551 763 A1 describes a completely encapsulated machine, which is cooled with the aid of vaporization cooling. The vaporized coolant condenses on an inner surface of the housing of the machine.

The invention is based on the object of specifying an electric rotating machine which is cooled simply and efficiently close to the ambient pressure.

SUMMARY OF THE INVENTION

This object is achieved according to the invention by an electric rotating machine comprising a rotor, a stator, and a closed machine housing enclosing the rotor and the stator, wherein the electric rotating machine has means for vaporization cooling of at least a part of the stator and/or the rotor using a vaporization coolant and wherein the electric rotating machine has means for mixed condensation of the vaporized vaporization coolant with a liquid condensation coolant in a mixed condensation chamber, wherein the mixed condensation chamber adjoins the stator inside the machine housing.

In addition, the object is achieved according to the invention by a method for cooling an electric rotating machine comprising a rotor, a stator, and a closed machine housing enclosing the rotor and the stator, wherein at least a part of the stator and/or the rotor is cooled using a vaporization coolant via vaporization cooling and wherein the vaporized vaporization coolant is converted back into a liquid phase with the aid of a liquid condensation coolant via a mixed condensation in a mixed condensation chamber, wherein the mixed condensation chamber adjoins the stator inside the machine housing.

The advantages and preferred embodiments listed hereafter with respect to the electric rotating machine may be transferred accordingly to the cooling method.

The invention is based on the concept of substituting air as an inefficient heat transfer medium in electric machines having closed internal air circuit in order to achieve higher heat transfer coefficients and thus less coolant heating and lower coolant volume flows. The alternative cooling method is based on spraying and vaporizing, i.e., a phase change, of a vaporization coolant and a subsequent condensation of the coolant vapor of the vaporization coolant with a condensation coolant in the form of a mixed condensation in spatial proximity to the heat sources. The mixed condensation takes place in the presence of non-condensable gases, in particular ambient air, by a direct contact with the condensation coolant below the dew point temperature of the coolant, i.e., with sufficient undercooling, close to ambient pressure. The inhibitory effect of inert gases located in the machine on the condensation of the coolant is avoided by way of the mixed condensation. Because of the favorable dielectric properties thereof, for example, oils, in particular low-viscosity silicone oils such as Baysilone or Midel oils, are used as coolants.

The inhibitory effect of inert gases located in the machine on the condensation of the coolant is avoided in particular by the spraying of a coolant into the mixed condensation chamber, whereby efficient cooling is achieved with low complexity.

Higher heat transfer coefficients are enabled by the vaporization cooling, in particular in comparison to solely sensitive cooling. Condensation in the presence of inert gases, in particular air, close to the ambient pressure is enabled by the mixed condensation, by the inhibitory effect of inert gases being avoided by thorough mixing.

In one preferred embodiment, the means for vaporization cooling comprise at least one device for generating a coolant mist, in particular an atomizing device. Optimum wetting of the components to be cooled and/or local strongly concentrated heat sources is achieved with comparatively low complexity by the use of an atomizing device, in particular a nozzle.

In a further advantageous embodiment, the means for mixed condensation comprise at least one device for generating a coolant mist, in particular a vaporizing device. The surface area available for heat transfer is high due to the use of a vaporizing device, in particular a nozzle, for example, in a mixed condensation chamber, due to the spraying of the coolant, and the sprayed coolant ensures good thorough mixing.

In a particularly advantageous manner, the means for mixed condensation are at least partially arranged in a mixed condensation chamber. The mixed condensation chamber is in particular delimited by the active components of the electric machine heated by heat loss, so that coolant liquid does not enter the mixed condensation chamber in an uncontrolled manner, but rather solely the gaseous coolant flow flows into the mixed condensation chamber, so that the vaporization cooling and the mixed condensation take place substantially spatially delimited from one another.

In one preferred embodiment, a heat exchanger is arranged in the mixed condensation chamber. In particular, the heat exchanger is embodied as a recuperator, the material flows of which are spatially separated by a heat-permeable wall and enable a heat transfer without direct contact of coolant and re-cooling medium. In addition to the mixed condensation, a conventional film condensation takes place in the mixed condensation chamber with the aid of the heat exchanger.

The heat exchanger is advantageously designed as a pipe bundle heat exchanger or plate heat exchanger. A pipe bundle heat exchanger has a plurality of pipes, which are parallel in particular, through which a cooling fluid flows. A plate heat exchanger has a plurality of plates, which are parallel in particular, through which a cooling fluid flows. Pipe bundle heat exchangers and plate heat exchangers have a large surface area for the heat transfer, for example, comprising ribs and/or lamellae, and are therefore embodied in a very space-saving manner, whereby they optimally supplement the mixed condensation.

In a further advantageous embodiment, a filler body is arranged in the mixed condensation chamber. In particular, the filler body is embodied as a structured packing, which is constructed, for example, from thin, corrugated, and perforated metal plates and/or wire nets, whereby an optimum exchange between the liquid phase of the condensation coolant and the gaseous phase of the vaporization coolant is ensured with minimal pressure resistance. The filler body lengthens the dwell time of the condensation coolant in the condensation chamber and thus increases the quantity of coolant vapor which is condensed in the mixed condensation.

In a further embodiment, the heat exchanger is arranged in the filler body. By way of such an arrangement, a combination of mixed condensation and film condensation is achieved in a very space-saving manner, i.e., a mixture of adiabatic heat dissipation and isothermal heat dissipation. Furthermore, the regions of the vaporization cooling and the mixed condensation chamber are delimited from one another in a manner which is space-saving and favorable for the heat transfer.

In one preferred embodiment, the mixed condensation chamber has a separator, which is arranged on a side of the mixed condensation chamber facing toward the stator. In particular, the separator is designed in the form of slotted partition plates, deflection plates, or alternatively as a filler body. The mixed condensation chamber is delimited from the components to be cooled of the electric rotating machine by the separator, so that no coolant liquid introduced on the vaporization side enters the mixed condensation chamber in an uncontrolled manner, but rather solely the gaseous coolant flow flows into the mixed condensation chamber. Furthermore, the separator discharges the condensed coolant liquid into the collector.

The atomizing device advantageously has at least one full cone nozzle. A large surface is wetted very uniformly and homogeneously by a full cone nozzle.

BRIEF DESCRIPTION OF THE DRAWING

In the following, the invention is described and explained in greater detail on the basis of the exemplary embodiments illustrated in the figures.

In the figures.

DETAILED DESCRIPTION OF PREFERRED EMBODIMENTS

Identical reference signs have identical meanings in the various figures.

Figure 1:
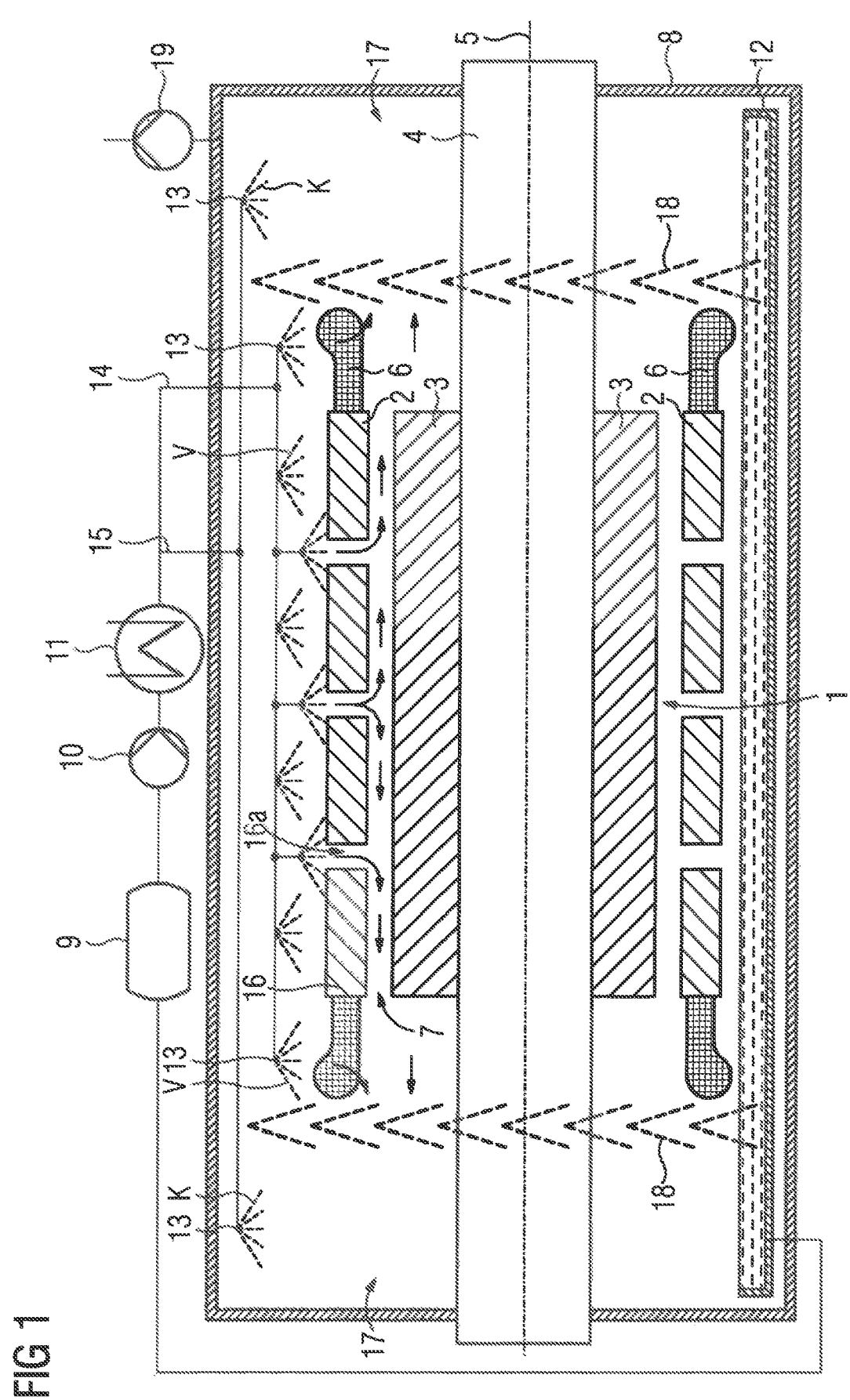
FIG. 1 shows a longitudinal section of an electric rotating machine comprising a first design of a cooling concept.

FIG. 1 shows a longitudinal section of an electric rotating machine 1 comprising a first design of a cooling concept for vaporization cooling using mixed condensation. The electric rotating machine 1 comprises a stator 2 and a rotor 3, wherein the rotor 3 comprises a shaft 4 and is rotatable around an axis of rotation 5. The stator comprises winding heads 6. A gap 7, which is embodied in particular as an air gap, is located between stator 2 and rotor 3. The electric rotating machine 1 is installed in a closed machine housing 8.

The concept for cooling the stator 2 and the rotor 3 of the electric rotating machine 1 provides spraying and vaporizing a vaporization coolant V and subsequently a mixed condensation of the vaporized vaporization coolant V with a condensation coolant K, wherein in particular the vaporization coolant V and condensation coolant K are identical. Oils, in particular low-viscosity silicone oils such as Baysilone or Midel oils, for example, are used as coolants because of the favorable dielectric properties thereof.

The electric rotating machine 1 comprises a coolant container 9 for implementing the cooling concept with sufficient dynamic range, a coolant pump 10 for circulating the liquid coolant and for pressure buildup, and a heat exchanger 11, which is embodied as a coolant-water heat exchanger or coolant-air heat exchanger. The heat exchanger 11 is arranged inside or outside the electric rotating machine 1. Furthermore, the electric rotating machine 1 comprises atomizing devices 13, also called spray devices, for spraying the cold liquid coolant, and a collector 12 for collecting the heated condensed coolant.

The hot liquid coolant, which originates from the collector 12, for example, is conveyed from the coolant container 9 by means of the coolant pump 10 through the heat exchanger 11, in which the waste heat absorbed by the electric machine is emitted to an external fluid circuit (not shown in FIG. 1) and the hot coolant is thus cooled down. The cooled coolant is allocated onto a first coolant path 14 as a vaporization coolant V for vaporization cooling and onto a second coolant path 15 as a condensation coolant K for mixed condensation.

In particular a stator plate packet 16 and the winding heads 6 of the stator 2, and also the rotor 3, are sprayed using the vaporization coolant V via the atomizing devices 13 for vaporization cooling. The undercooled coolant liquid is sprayed in particular through radial cooling slots 16a in the stator 2 or other oil mist channels onto the rotor 3. In contact with active components of the electric machine 1 heated by waste heat, in particular the rotor 3 and the stator 2 having winding heads 6, the vaporization coolant V first heats up sensitively, i.e., the undercooling is dissipated before a pressure-dependent saturation temperature is reached and the vaporization coolant V vaporizes at a corresponding excess temperature of the components, for example, 10 K. Accordingly a film cooling occurs in combination with bubble vaporization on the surface of the active components, whereby correspondingly high coefficients of heat transfer are achieved, for example, one hundred times higher than by means of a forced convection using air. In addition, a convection in a coolant film on the components to be cooled is increased by mixing of the coolant of the coolant film with the sprayed coolant due to the spraying of the coolant.

In the spraying of the vaporization coolant V, it is important by way of the mechanical embodiment of the spraying devices 13 having suitable nozzles to ensure optimum wetting of the active components with the coolant, in particular optimum contact with an oil mist generated by the spraying devices 13 and also a high convection in the wetting coolant film. A sudden volume increase of the sprayed coolant flow occurs due to a density jump due to a phase change from a liquid into a gaseous phase, i.e., the vaporization of the vaporization coolant V.

The now gaseous coolant flow of the vaporization coolant V expands because of the pressure differences of the sprayed components, in particular the stator plate packet 16, the winding heads 6, and the rotor 3, in the direction of the axial ends of the electric rotating machine 1 into a mixed condensation chamber 17. The coolant flow can also be guided through slotted partition plates, which are not shown in FIG. 1 for reasons of comprehensibility, in the radial direction. The vaporization coolant V is conducted via a suitable guide, in particular as shown in FIG. 1, via the gap 7 to the mixed condensation chamber 17. The partial pressure of the coolant, in particular the oil, in the air is lower in the mixed condensation chamber 17 because of the low oil temperature in comparison to the vaporization chamber. One or more mixed condensation chambers 17 can be arranged in the electric rotating machine 1. The two mixed condensation chambers 17 in FIG. 1 are arranged between the axial ends of the rotor 3 and the end faces of the machine housing 8. Alternatively, the mixed condensation chamber 17 can be arranged radially above the stator 2 of the electric rotating machine 1. The position and number of condensation chambers 17 is dependent on the design of the electric rotating machine 1.

In the mixed condensation chamber 17, a liquid undercooled condensation coolant K is finely distributed via vaporization devices 13 and thus sprayed with large surface area for the heat transfer. The overflowing coolant vapor of the vaporization coolant V is condensed below a cooling medium dewpoint temperature in direct contact with the sprayed condensation coolant K. Such a mixed condensation takes place, without a physical spatial separation of the vaporization coolant V to be cooled and the condensation coolant K heated at the same time, by way of mixing. A heat exchanger is not required, because of which in particular soiling of heat exchanger surfaces during mixed condensation is precluded.

Each of the mixed condensation chambers 17 has a separator 18, which is designed in FIG. 1 in the form of deflection plates. The deflection plates are optionally combined with a wire knitted fabric, which delimits the part of the electric rotating machine 1, in which the vaporization coolant V vaporizes, from the mixed condensation chamber 17, so that only the gaseous coolant flow of the vaporization coolant V flows into the mixed condensation chamber 17. Alternatively, the separator 18 is formed from slotted partition plates, optionally having a downstream filler body. The separator 18 additionally determines the guiding of the gaseous coolant flow of the vaporization coolant V to the sprayed coolant flow of the condensation coolant K.

The vaporization coolant V which is not vaporized during the vaporization cooling and the coolant liquefied during the mixed condensation are accommodated in the collector 12 and conveyed by the coolant pump 10 via the coolant container 9 back to the heat exchanger 11, whereby the coolant circuit of vaporization cooling and mixed condensation is closed. A filter dryer (not shown in FIG. 1) is optionally provided before the coolant container 9 to filter contaminants and moisture out of the liquid coolant, in particular oil. To exhaust air components from the machine housing 8, in particular during starting procedures or to lower the system pressure and thus the vaporization temperature, a vacuum pump 19 is optionally provided. The system pressure can be actively set and inert gases, which inhibit the condensation and penetrate into the electric machine in operation or at a standstill, can be suctioned out of the facility by exhausting the air through the vacuum pump 19. The partial pressure of the condensed coolant vapor is thus prevented from sinking excessively strongly due to the presence of inert gases, air here, whereby the condensation temperature would have to be lowered further to achieve uniform heat dissipation.

Figure 2:
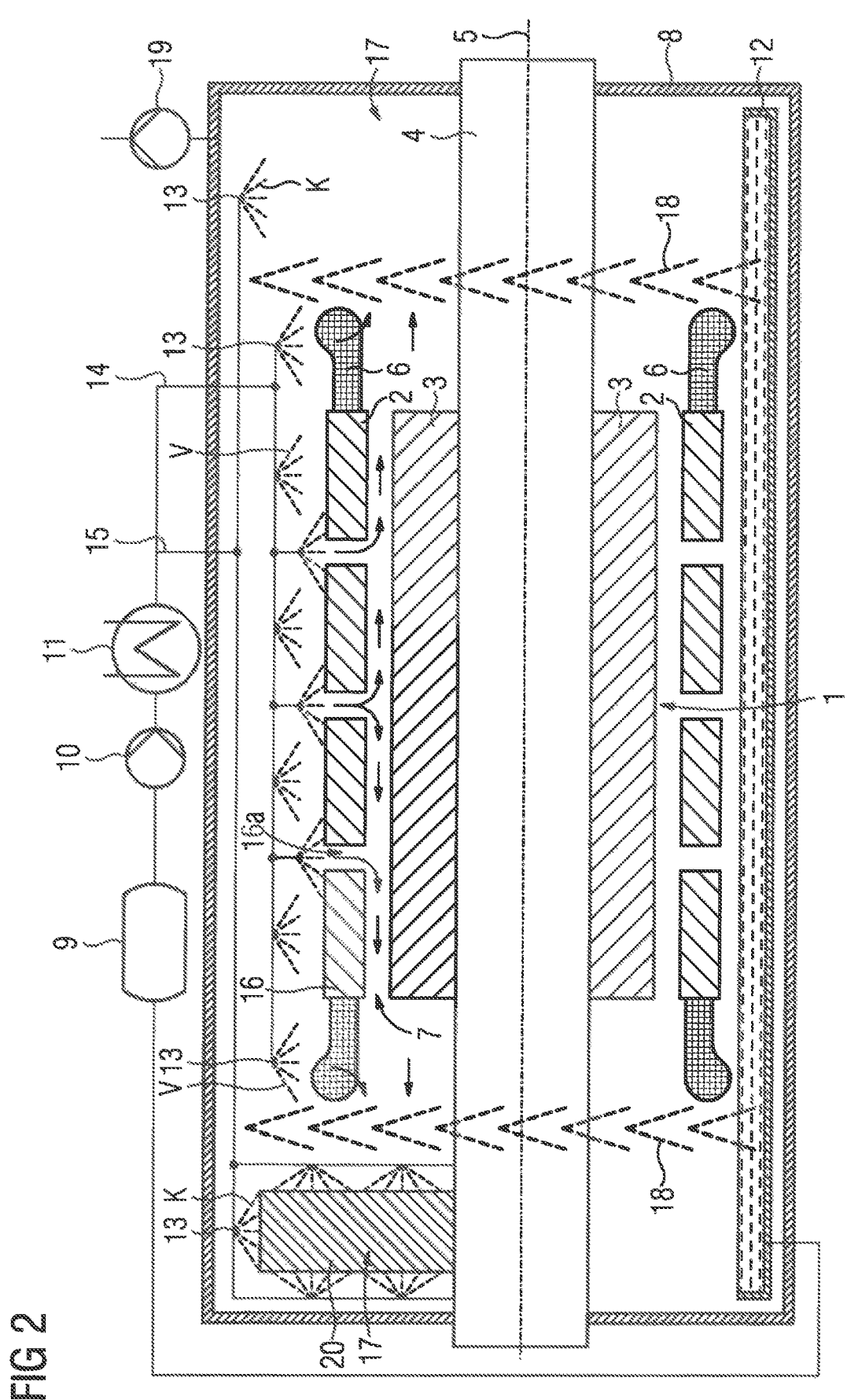
FIG. 2 shows a longitudinal section of an electric rotating machine comprising a second design of a cooling concept.

FIG. 2 shows a longitudinal section of an electric rotating machine 1 comprising a second design of a cooling concept for vaporization cooling using mixed condensation. A mixed condensation chamber 17 comprises a filler body 20, which is embodied as a structured packing and which lengthens the dwell time of the condensation coolant K in the condensation chamber to lengthen the contact time of the coolant vapor with the undercooled coolant and thus condense more coolant vapor. The structured packing is preferably constructed from thin, corrugated, and perforated metal plates and/or wire nets, whereby an optimum exchange is ensured between the liquid phase of the condensation coolant K and the gaseous phase of the vaporization coolant V with minimal pressure resistance. To keep the axial length of the electric rotating machine 1 short, the filler body 20 is arranged laterally above the active parts. The filler body 20, as shown in FIG. 2, can be arranged on one side or on both sides in a mixed condensation chamber 17. Alternatively, a filler body 20 is arranged in a mixed condensation chamber 17 radially above the stator 2 of the electric rotating machine 1. Furthermore, multiple filler bodies 20 can be arranged in a mixed condensation chamber 17. The atomizing devices 13 are arranged in particular around the filler body 20 and spray it from multiple sides in order to sufficiently wet the filler body. The further embodiment of the electric rotating machine 1 corresponds to the embodiment in FIG. 1.

Figure 3:
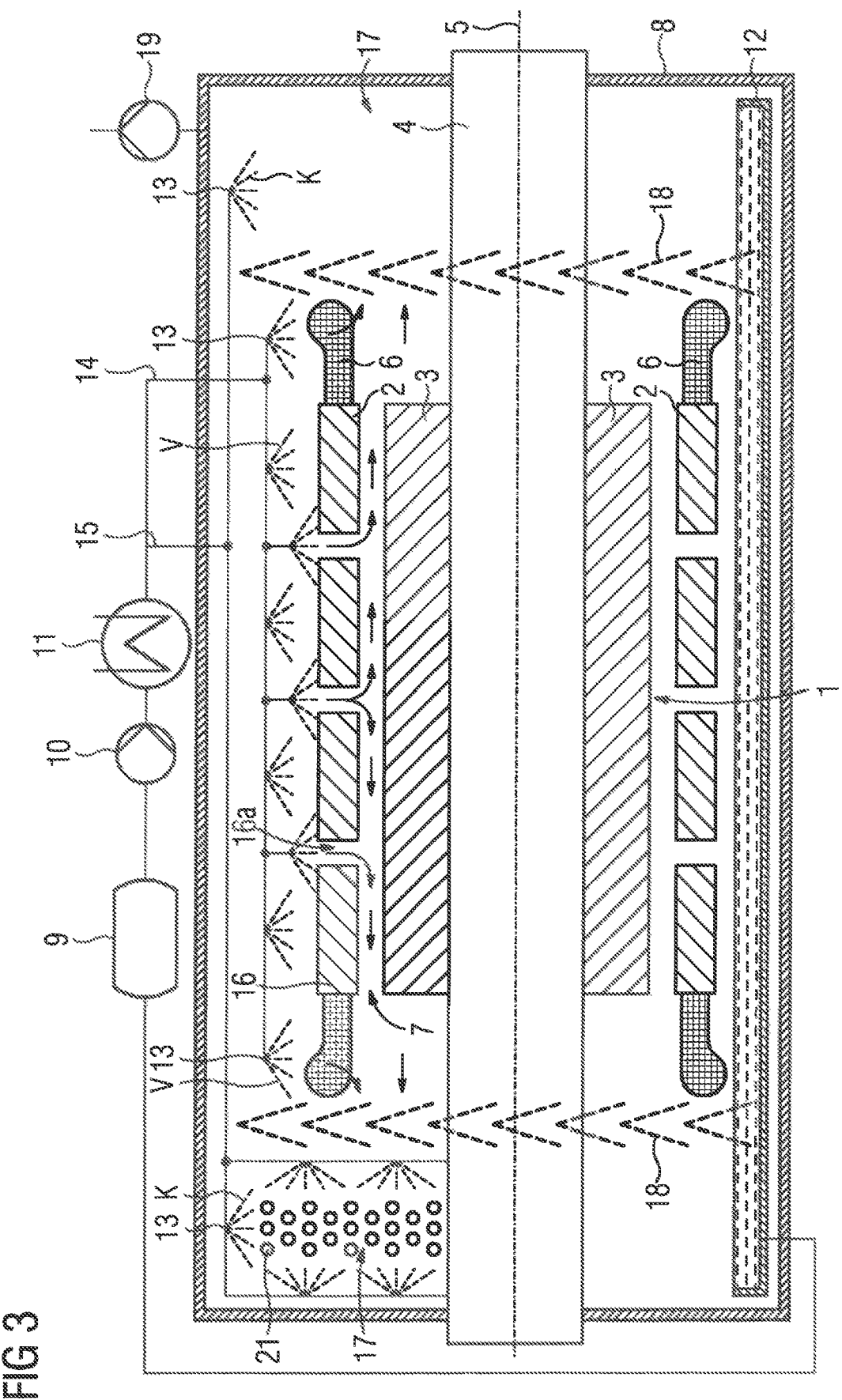
FIG. 3 shows a longitudinal section of an electric rotating machine comprising a third design of a cooling concept.

FIG. 3 shows a longitudinal section of an electric rotating machine 1 comprising a third design of a cooling concept. A mixed condensation chamber 17 comprises a heat exchanger 21, which is embodied as a pipe bundle heat exchanger, also called a recuperator, the offset pipes of which have cooling water flowing through them. In addition to the mixed condensation, a conventional film condensation takes place on the heat exchanger 21 in the mixed condensation chamber 17. The heat exchanger is alternatively embodied as a plate heat exchanger and optionally has structures enlarging the area for heat transfer, in particular ribs and/or lamellae.

The heat exchanger 21, as shown in FIG. 3, is arranged on one side or on both sides in a mixed condensation chamber 17. Alternatively, a heat exchanger 21 is arranged in a mixed condensation chamber 17 radially above the stator 2 of the electric rotating machine 1. Furthermore, multiple heat exchangers 21 can be arranged in a mixed condensation chamber 17. The atomizing devices 13 are arranged around the heat exchanger 21 and spray it from multiple sides. An accumulation of inert gases inhibiting heat transfer is avoided due to the spraying of the heat exchanger 21. The further embodiment of the electric rotating machine 1 corresponds to the embodiment in FIG. 1.

Figure 4:
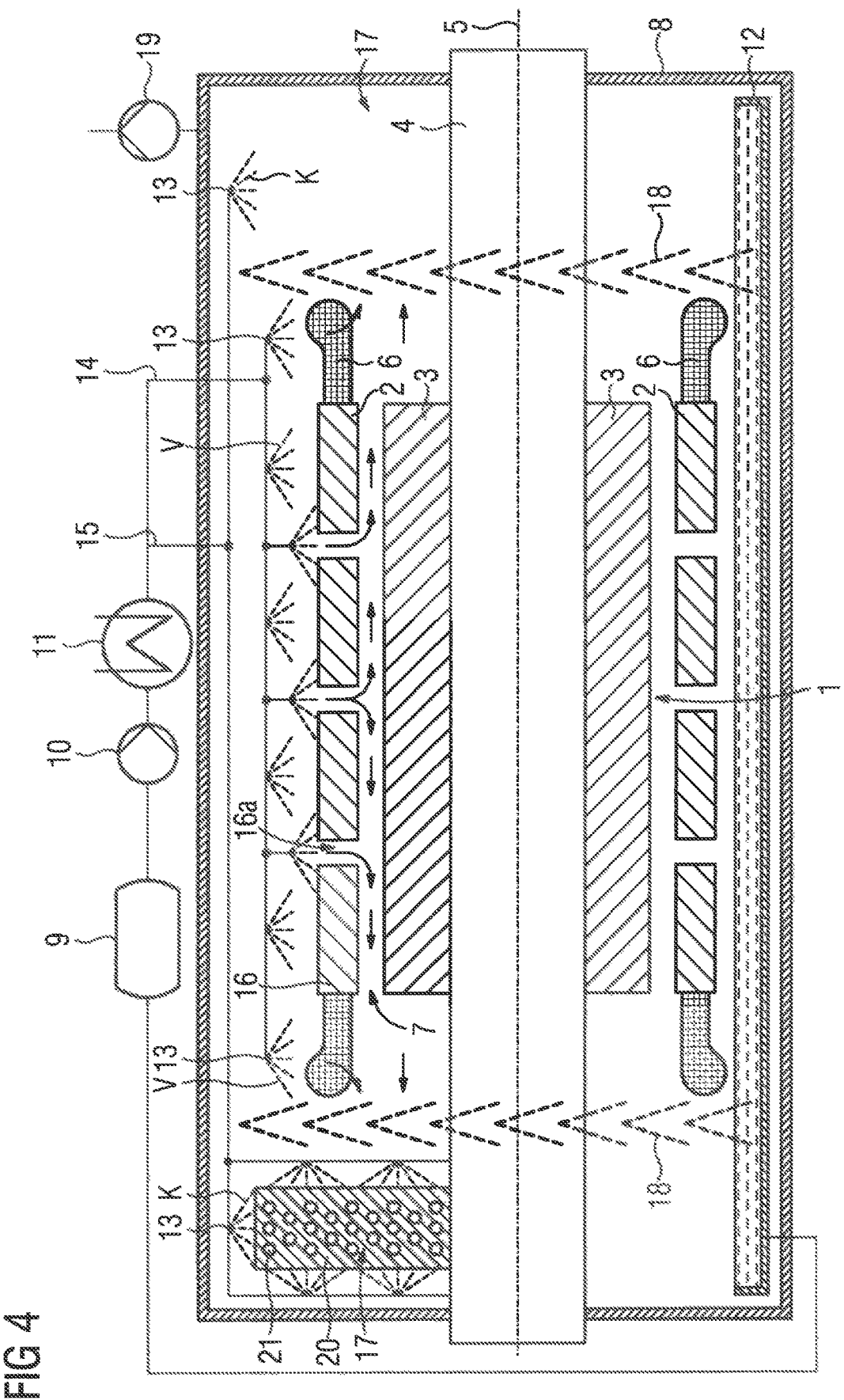
FIG. 4 shows a longitudinal section of an electric rotating machine comprising a fourth design of a cooling concept.

FIG. 4 shows a longitudinal section of an electric rotating machine 1 comprising a fourth design of a cooling concept. A mixed condensation chamber 17 comprises a filler body 20 which, as shown in FIG. 2, is embodied as a structured packing and through which the pipes of a heat exchanger 21 embodied as a pipe bundle heat exchanger extend. The atomizing devices 13 are arranged around the filler body 20 combined with the heat exchanger 21 and spray it from multiple sides. The dwell time of the undercooled condensation coolant K in the condensation chamber is lengthened by the structured packing to condense more coolant vapor in the mixed condensation. Due to the heat exchanger 21, a conventional film condensation takes place in the mixed condensation chamber 17 in addition to the mixed condensation. The further embodiment of the electric rotating machine 1 corresponds to the embodiment in FIG. 1.

In summary, the invention relates to an electric rotating machine 1 comprising a rotor 3 and a stator 2. To cool the electric rotating machine 1 simply and efficiently close to ambient pressure, it is proposed that the electric rotating machine 1 comprises means for vaporization cooling of at least a part of the stator 2 and/or the rotor 3 using a vaporization coolant V and means for mixed condensation of the vaporized vaporization coolant V with a liquid condensation coolant K.

What is claimed is:

1. An electric rotating machine, comprising:
    a machine housing having a mixed condensation chamber;
    a rotor accommodated in the machine housing;
    a stator accommodated in the machine housing in adjacent relationship to the mixed condensation chamber;
    a cooling device including a first assembly configured to expose at least a part of the stator and/or the rotor to a vaporization coolant which vaporizes when contacting the part so as to effect a vaporization cooling, and a second assembly configured to dispense a liquid condensation coolant into the mixed condensation chamber for contacting the vaporization coolant to effect a mixed condensation of the vaporized vaporization coolant with the liquid condensation coolant in the mixed condensation chamber; and
    a separator in the form of slotted partition plates, deflection plates with fabric, or as a filler body arranged on a side of the mixed condensation chamber in facing relationship toward the stator to delimit the mixed condensation chamber from the part,
    wherein the mixed condensation chamber is delimited from the stator and the rotor by the separator, so that only a gaseous coolant flow of the vaporization coolant flow flows into the mixed condensation chamber.

2. The electric rotating machine of claim 1, wherein the first assembly is a spray device to generate a coolant mist, when dispensing the vaporization coolant.

3. The electric rotating machine of claim 2, wherein the spray device is an atomizing device.

4. The electric rotating machine of claim 3, wherein the atomizing device comprises a full cone nozzle.

5. The electric rotating machine of claim 1, wherein the second assembly is a spray device to generate a coolant mist, when dispensing the condensation coolant.

6. The electric rotating machine of claim 5, wherein the spray device is an atomizing device.

7. The electric rotating machine of claim 6, wherein the atomizing device comprises a full cone nozzle.

8. The electric rotating machine of claim 1, wherein the second assembly for mixed condensation is at least partially arranged in the mixed condensation chamber.

9. The electric rotating machine of claim 1, wherein the second assembly includes a heat exchanger arranged in the mixed condensation chamber.

10. The electric rotating machine of claim 9, wherein the heat exchanger is embodied as a pipe bundle heat exchanger or plate heat exchanger.

11. The electric rotating machine of claim 1, wherein the second assembly includes the filler body arranged in the mixed condensation chamber.

12. The electric rotating machine of claim 11, wherein the second assembly includes a heat exchanger arranged in the filler body.

13. A method for cooling an electric rotating machine having a machine housing for accommodating a stator and a rotor, said method comprising:
    cooling at least a part of the stator and/or rotor of the electric rotating machine using a vaporization coolant via vaporization cooling, thereby converting the vaporization coolant to a vaporized phase; and
    transferring the vaporized vaporization coolant back into a liquid phase with the aid of a liquid condensation coolant via mixed condensation in a mixed condensation chamber in adjacent relationship to the stator inside the machine housing, wherein a separator in the form of slotted partition plates, deflection plates with fabric, or as a filler body is arranged on a side of the mixed condensation chamber in facing relationship toward the stator to delimit the mixed condensation chamber from the part of the stator and/or rotor, wherein the mixed condensation chamber is delimited from the stator and the rotor by the separator, so that only a gaseous coolant flow of the vaporization flow flows into the mixed condensation chamber.

14. The method of claim 13, further comprising spraying the vaporization coolant such as to generate a coolant mist onto the part.

15. The method of claim 13, further comprising spraying the condensation coolant at least partially into the mixed condensation chamber to thereby form a coolant mist.

16. The method of claim 15, wherein the condensation coolant is at least partially sprayed onto a heat exchanger.

17. The method of claim 15, wherein the condensation coolant is at least partially sprayed onto a pipe bundle heat exchanger and/or a plate heat exchanger.

18. The method of claim 15, wherein the condensation coolant is at least partially sprayed onto the filler body.

\* \* \* \* \*

UNITED STATES PATENT AND TRADEMARK OFFICE
CERTIFICATE OF CORRECTION

PATENT NO. : 10,879,771 B2
APPLICATION NO. : 16/486702
DATED : December 29, 2020
INVENTOR(S) : Mark Tobias Zegenhagen It is certified that error appears in the above-identified patent and that said Letters Patent is hereby corrected as shown below:

On the Title Page

Item (30):
Delete "EP 17156700" and insert --EP 17156700.1--.

Signed and Sealed this
Twenty-third Day of February, 2021

Drew Hirshfeld
*Performing the Functions and Duties of the*
*Under Secretary of Commerce for Intellectual Property and*
*Director of the United States Patent and Trademark Office*